US011874633B2

(12) United States Patent
Klopfenstein

(10) Patent No.: US 11,874,633 B2
(45) Date of Patent: Jan. 16, 2024

(54) METHOD FOR ADJUSTING THE OPERATING FREQUENCY OF AN ELECTRONIC WATCH

(71) Applicant: ETA SA Manufacture Horlogère Suisse, Grenchen (CH)

(72) Inventor: Francois Klopfenstein, Delemont (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 1162 days.

(21) Appl. No.: 16/492,960

(22) PCT Filed: Mar. 13, 2018

(86) PCT No.: PCT/EP2018/056302
§ 371 (c)(1),
(2) Date: Sep. 11, 2019

(87) PCT Pub. No.: WO2018/172147
PCT Pub. Date: Sep. 27, 2018

(65) Prior Publication Data

US 2020/0019127 A1 Jan. 16, 2020

(30) Foreign Application Priority Data

Mar. 20, 2017 (EP) .................................... 17161866
Apr. 25, 2017 (EP) .................................... 17167994
Nov. 20, 2017 (EP) .................................... 17202602

(51) Int. Cl.
*G04G 5/02* (2006.01)
*G04D 7/12* (2006.01)

(52) U.S. Cl.
CPC ............... *G04G 5/027* (2013.01); *G04D 7/12* (2013.01)

(58) Field of Classification Search
CPC . G04G 5/027; G04G 5/02; G04D 7/12; G04R 40/06
See application file for complete search history.

(56) References Cited

U.S. PATENT DOCUMENTS 4,211,065 A * 7/1980 Schmitz ................ G04R 20/28 368/185
4,763,309 A * 8/1988 Descombes ............ G04D 7/003 368/200

(Continued)

FOREIGN PATENT DOCUMENTS

CN 1051278 A 5/1991
CN 1334949 A 2/2002

(Continued)

OTHER PUBLICATIONS

Combined Chinese Office Action and Search Report dated Aug. 28, 2020 in Chinese Patent Application No. 201880019442.7 (with Translation of Category of Cited Documents), 6 pages.

(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A method for adjusting the operating frequency of an electronic watch via a computer application installed in a portable electronic device, the adjustment method including the following steps, performed by the computer application: generating a pulsed reference signal in the portable electronic device, converting the pulsed reference signal into a modulated optical signal consisting of light pulses, transmitting the modulated optical signal to the electronic watch via the light source or via a modulation of the light emitted by the screen of the portable electronic device, and the following steps, performed by the electronic watch: recon- (Continued)

stituting the pulsed reference signal from the modulated optical signal received by the optical sensor, correcting an inhibition value stored in the memory of an adjustment circuit of the electronic watch as a function of the pulsed reference signal.

12 Claims, 1 Drawing Sheet

(56) References Cited

U.S. PATENT DOCUMENTS

| | | | | |
|---|---|---|---|---|
| 5,594,462 | A | 1/1997 | Fishman et al. | |
| 8,909,847 | B2 * | 12/2014 | Novac | G11C 16/10 711/164 |
| 2014/0152355 | A1 * | 6/2014 | Godat | H03B 19/00 327/117 |
| 2015/0253737 | A1 * | 9/2015 | Godat | G04G 3/022 368/160 |
| 2016/0266554 | A1 * | 9/2016 | Ogasawara | G04C 10/02 |
| 2016/0299475 | A1 * | 10/2016 | Baba | G04R 20/28 |

FOREIGN PATENT DOCUMENTS

| | | | |
|---|---|---|---|
| CN | 106954588 | A | 7/2017 |
| EP | 2 916 193 | B1 | 7/2016 |
| EP | 3 079 025 | A1 | 10/2016 |
| JP | 51-75563 | A | 6/1976 |
| JP | 63-29291 | A | 2/1988 |
| JP | 5-235917 | A | 9/1993 |
| JP | 2004-336203 | A | 11/2004 |
| JP | 2014-48136 | A | 3/2014 |
| JP | 2016-102742 | A | 6/2016 |
| JP | 2017-40533 | A | 2/2017 |
| KR | 10-2015-0105241 | A | 9/2015 |
| WO | WO 2015/072281 | A1 | 5/2015 |

OTHER PUBLICATIONS

Japanese Office Action dated Sep. 29, 2020 in Japanese Patent Application No. 2019-571778 (with English translation), 8 pages.
Korean Office Action dated Nov. 20, 2020 in Korean Patent Application No. 10-2019-7027499 (with English translation), 15 pages.
International Search Report dated Jul. 9, 2018 in PCT/EP2018/056302 filed on Mar. 13, 2018.

* cited by examiner

METHOD FOR ADJUSTING THE OPERATING FREQUENCY OF AN ELECTRONIC WATCH

CROSS REFERENCE TO RELATED APPLICATIONS

This application is a United States national stage application of International Application No. PCT/EP2018/056302, filed Mar. 13, 2018, which designates the United States, and claims priority to European Patent Application No. 17161866.3, filed Mar. 20, 2017; European Patent Application No. 17167994.7, filed Apr. 25, 2017, and European Patent Application No. 17202602.3, filed Nov. 20, 2017, the entire contents of each of which are incorporated herein by reference.

FIELD OF THE INVENTION

The invention concerns the field of electronic watches. The invention more particularly concerns a method for adjusting the operating or clocking frequency of an electronic watch, particularly an electronic watch provided with a quartz oscillator.

BACKGROUND OF THE INVENTION

Electronic watch movements generally have a time base providing a time signal and a display module receiving this time signal, which consists of clocking pulses. The time base includes a dock circuit and a frequency divider circuit. The clock circuit consists of a quartz oscillator which provides a clock signal to the frequency divider circuit, this clock signal having a determined clock frequency. The frequency divider circuit consists of a chain of dividers which output a time signal consisting of clocking pulses. For electronic watches, particularly of the analogue display type, the clocking signal generally has a frequency of 1 Hz so that the seconds hand is activated by a stepping motor at the rhythm of the seconds, that is to say on an arc of a circle at an angle of 6° every second.

In industrial production, it is, however, difficult to produce oscillators having a well-defined reference frequency, in order to obtain, at the output of a series of dividers, clocking pulses at a reference frequency unit, such as at 1 Hz. Such oscillators are generally arranged to be made at the end of the production phase with a reference frequency in a slightly higher frequency range. To best adjust the time signal generated by the time base, it is known to combine the time base with an inhibition or adjustment circuit, which provides at the input of the frequency divider circuit an inhibition signal which acts to remove a number of clock pulses during inhibition periods, for example lasting around one minute, for mean correction of the reference frequency. Specialized measuring and programming equipment can determine a deviation in the operating frequency with respect to a reference clock and programme a number of pulses to be removed so that the operating frequency of the electronic watch is as close as possible to the reference clock frequency.

The use of specialized measuring and programming equipment is currently essential in order to calibrate the operating frequency of the electronic watch. However, this equipment has the drawback of being expensive. The operating frequency of the electronic watch can thus only be calibrated, in principle, during quality control of the watch prior to marketing or in an after-sales service operation for which the watch has to be returned to the factory or to a customer service outlet that has this equipment.

SUMMARY OF THE INVENTION

It is consequently an object of the present invention to propose a method of adjusting the operating frequency of an electronic watch which has the advantage of not requiring specialized measuring and programming equipment and whose implementation is greatly facilitated.

To this end, according to one aspect of the invention, there is proposed a method of adjusting the operating frequency of an electronic watch by means of a computer application installed in a portable electronic device including, in particular, a microcontroller, a light source and a screen, wherein the electronic watch comprises an electronic module including:

- an oscillator and a frequency divider circuit which is arranged downstream of the oscillator and which is configured to transmit a pulsed signal corresponding to the operating frequency
- an operating frequency adjustment circuit including a memory storing an inhibition value, the adjustment circuit being arranged to inhibit one or more pulses transmitted by the frequency divider circuit as a function of the inhibition value
- a communication unit for communicating with the portable electronic device, the communication unit comprising an optical sensor arranged to receive a signal in the form of a sequence of optical pulses, called a modulated optical signal
- a microcontroller arranged to control the operating frequency adjustment circuit as a function of the modulated optical signal received by the communication unit, the adjustment method including the following steps, performed by the computer application:

- generating a pulsed reference signal in the portable electronic device
- converting the pulsed reference signal into a modulated optical signal consisting of light pulses
- transmitting to the optical sensor of the communication unit of the electronic watch the modulated optical signal via the light source or via a modulation of the light emitted by the screen of the portable electronic device, and the following steps, performed by the microcontroller of the electronic watch:

- reconstituting the pulsed reference signal from the modulated optical signal received by the optical sensor correcting the inhibition value stored in the adjustment circuit memory as a function of the pulsed reference signal.

The method makes it possible to correct the operating frequency of the electronic watch by inhibiting one or more pulses transmitted by the frequency divider circuit as a function of the corrected inhibition value.

In the present Application, 'inhibition value' means:

- a value that was stored in the memory of the operating frequency adjustment circuit during a time calibration operation, for example, prior to marketing the watch, in order to avoid a deviation in operating frequency with respect to a reference clock of a measuring device. The measuring equipment is, for example, of the type sold by Witschi Electronic S.A and also computes, as a function of this frequency, the inhibition value corresponding to a number of pulses to be removed in the frequency divider so that the operating frequency is as close as possible to the reference clock frequency of the measuring equipment; or the inhibition value that was stored in the memory of the operating frequency adjustment circuit during a subsequent operating frequency correction according to the adjustment method disclosed in the present Application.

Moreover, in the present Application, 'correcting the inhibition value' means replacing the inhibition value in the memory of the frequency adjustment circuit with a new value or correcting the inhibition value by applying an offset.

Further, in the present Application, 'modulated optical signal' means a sequence of light pulses whose duration and spacing may vary depending on the information coded by the signal. For example, each light pulse may represent a bit value of '1' and each absence of light pulse a bit value of '0', such that the modulated optical signal can code a numerical value, for example in 32 bits, representative of a reference value used to replace or correct the inhibition value.

Moreover, the method may include the additional features presented in the dependent claims, taken individually or in any technically possible combination.

BRIEF DESCRIPTION OF THE DRAWINGS

Other features and advantages will appear clearly from the following description, given by way of non-limiting illustration, with reference to the annexed drawings, in which.

DETAILED DESCRIPTION OF EMBODIMENTS OF THE INVENTION

Figure 1:
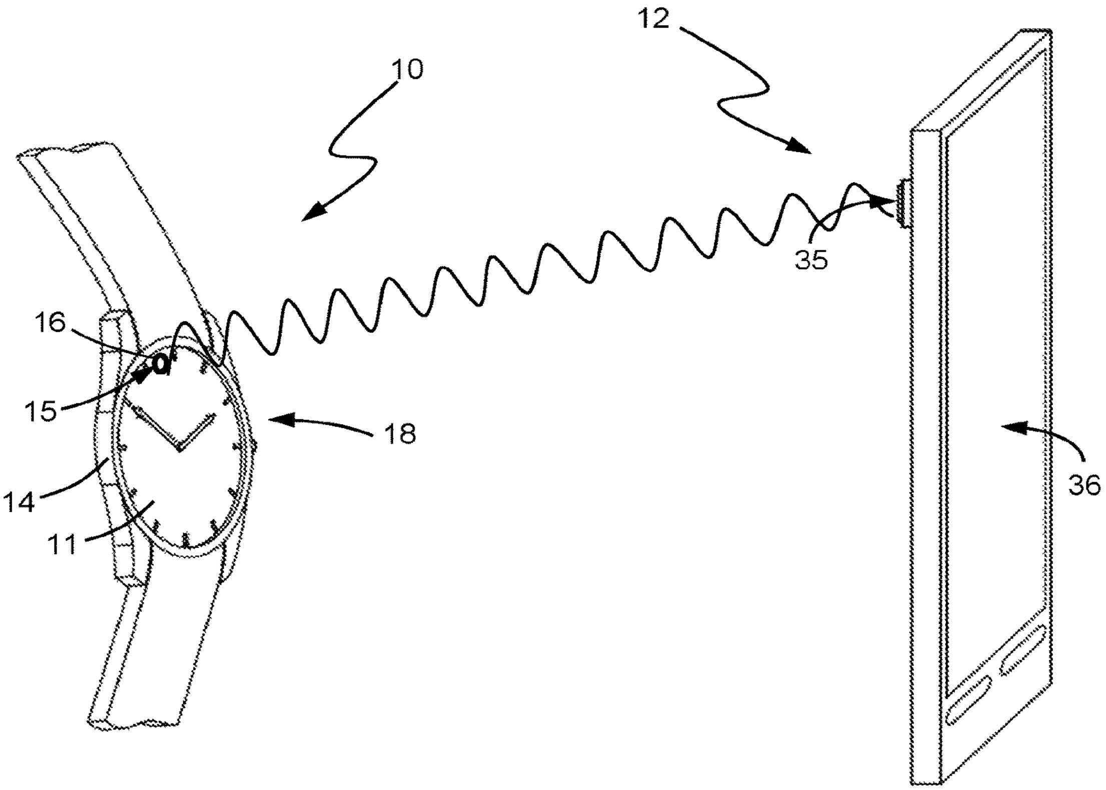
FIG. 1 represents a perspective view of an electronic watch and a portable electronic device used to implement a method according to the invention.

Referring to FIG. 1, the electronic watch 10 is configured to communicate with a portable electronic device 12, for example a smartphone or tablet. Portable electronic device 12 is configured to transmit a modulated optical signal to electronic watch 10 in order to adjust the operating frequency of the watch. To this end, electronic watch 10 has a dial 11 including an aperture 15 or a portion transparent to optical waves. An optical sensor 16, for example a photodiode or a phototransistor, is arranged in the aperture or underneath transparent portion 15. In a non-illustrated variant, optical sensor 16 can be integrated in the case middle 14 of electronic watch 10, in particular if said case middle 14 is made of transparent plastic. In another non-illustrated variant, optical sensor 16 can be arranged on the back side of a watch case of the type with a transparentback cover so as to be visible through a sapphire crystal for example. Electronic watch 10 also includes analogue type time display means 18, including hands driven by a stepping motor (not illustrated). In a variant, the time display means may be of the digital type.

Figure 2:
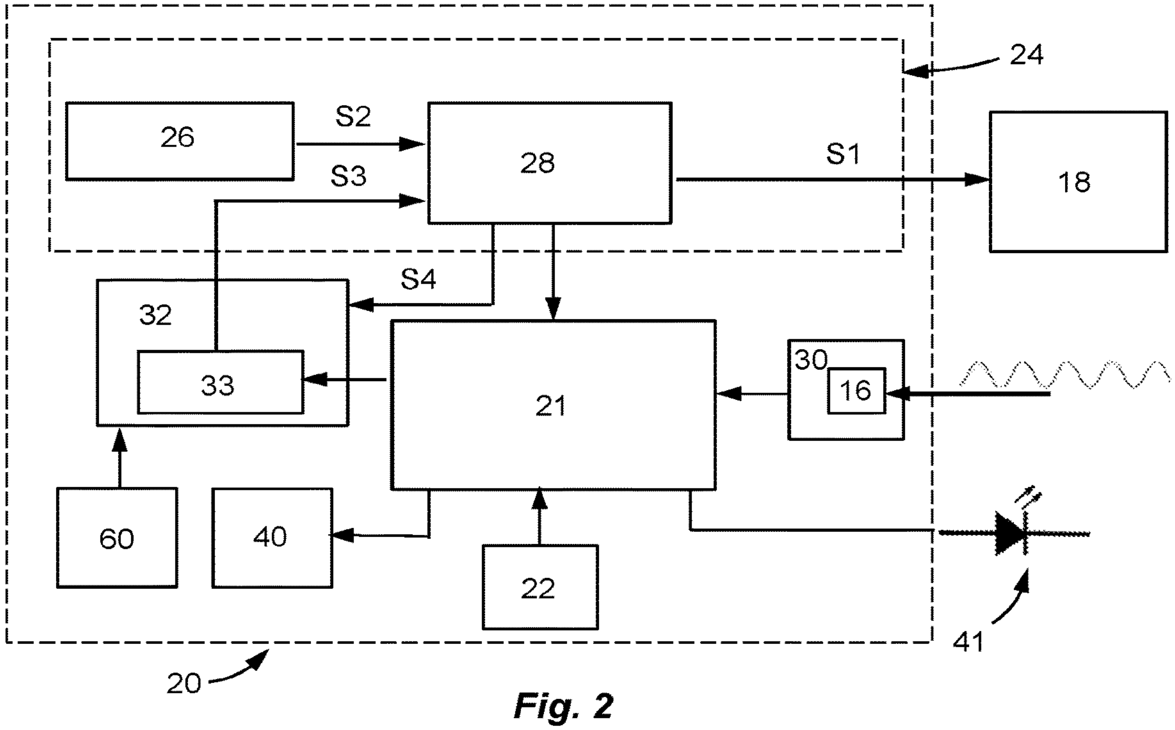
FIG. 2 represents a block diagram of an electronic module of the watch of FIG. 1.

In FIG. 2, the electronic watch is equipped with an electronic module 20 comprising a microcontroller 21, a power unit 22, for example a battery or cell, for powering microcontroller 21, and a unit 24 for clocking the operating frequency of the electronic watch. This clocking unit 24 includes an oscillator 26, for example a quartz oscillator, which provides a clock signal S2 consisting of pulses generated at a determined clock frequency, and a frequency divider circuit 28 arranged downstream of oscillator 26 and which receives at a first input the clock pulses from clock signal S2 and which outputs a pulsed signal S1 at the operating frequency of the electronic watch. This signal S1 sent to the terminals of the stepping motor coils of the watch, in order to drive the hands of the time display. Electronic module 20 further includes a communication unit 30 including, in particular, optical sensor 16 connected to microcontroller 21, and a circuit 32 for adjusting the operating frequency of the electronic watch. Adjustment circuit 32 includes a memory 33, for example of the RAM, EEPROM or Flash type, configured to store an inhibition value in a suitable register. Adjustment circuit 32 provides an inhibition signal S3 to a second input of frequency divider circuit 28. The latter is connected to adjustment circuit 24 in order to transmit thereto a control signal S4, on the one hand, to synchronize adjustment circuit 32 with unit 24 for clocking the operating frequency of the electronic watch, and on the other hand, to control the periodic sending of the inhibition signal. Adjustment circuit 32 preferably acts on the output of the second stage of frequency divider circuit 28, where the signal frequency is, for example, at a frequency close to 16 kHz for a 32 Hz quartz oscillator. A programmed number of pulses of the second stage of frequency divider circuit 28 is, for example, removed every 60 seconds.

Referring to FIG. 1, portable electronic device 12 includes, in particular, a light source 35, for example one or more light emitting diodes normally used as a flash for a camera. Electronic device 12 also includes a touch screen 36 and a microcontroller (not illustrated). Electronic device 12 also includes a computer application for adjusting the operating frequency of electronic watch 10. This computer application can be downloaded from a computer server and is compatible with the IOS® and Android® operating systems.

In one embodiment, when the computer application is started, the microcontroller of portable electronic device 12 executes a sequence of instructions in order to perform the following steps: i) generating in portable electronic device 12 a pulsed reference signal representative of a reference value; ii) converting the pulsed reference signal into a modulated optical signal; and then iii) transmitting the modulated optical signal via light source 35 to optical sensor 16 of electronic watch 10 by placing the watch and the electronic device opposite each other and at a short distance from each other, or one against the other.

According to this embodiment, the deviation in operating frequency of the electronic watch (or error of rate) with respect to a reference clock is determined in advance by dedicated measuring equipment, sold by Witschi Electronic SA. This equipment is capable of estimating the operating frequency deviation (or error of rate) during a determined period with respect to a reference clock. The operating frequency may have been determined, for example, by measuring over a period of two seconds the edges between the first and third pulses of the stepping motor by means of an inductive sensor of the measuring equipment. The deviation in operating frequency of the electronic watch may alternatively have been determined directly by the user of the watch by periodically comparing the time displayed by the electronic watch to a reference clock. The adjustment of the operating frequency will, however, be less accurate. Based on the estimated deviation, the aforementioned inhibition value could be computed and entered in memory 33.

Screen 36 of portable electronic device 12 includes an interface configured to allow a numerical value to be entered when the computer application is operational. In one embodiment, the numerical value corresponds to a new operating frequency deviation value, intended to replace or correct the inhibition value stored in memory 33. This numerical value can be expressed, for example, in a format corresponding to a number of seconds per year, per month or per day. The computer application is configured to control light source 35 of portable electronic device 12 in order to transmit to electronic watch 10 a modulated optical signal representative of the numerical value. This numerical value is a signed number to take account of a positive or negative deviation in the operating frequency, that is to say whether the time indicated by the watch is fast or slow with respect to a reference clock.

During the operating frequency adjustment operation, the person using/wearing electronic watch 10 configures the latter in adjustment mode, for example by actuating a pusher, by turning the bezel or crown of the watch so that it is in a certain angular position, or by a single press or by a series of presses on the crown. The person using/wearing the watch then positions light source 35 of portable electronic device 12 in proximity to the aperture or to transparent portion 15 arranged on watch case 14 so that optical sensor 16 can directly receive and capture the light signals transmitted by light source 35. The transmission of the modulated optical signal to optical sensor 16 is then started by interacting with the interface of portable electronic device 12, for example by pressing on a specific area of touch screen 36. During transmission of the modulated optical signal, which corresponds to a period of around a few seconds, optical sensor 16 of the watch receives a sequence of light pulses. As soon as the optical signal transmission ends, microcontroller 21 analyses whether the transmitted data can be deciphered and then sends a signal to a light transmitter 41 (a warning light) to indicate to the user whether the entire modulated optical signal transmitted by light source 35 has been properly transmitted. The warning light may be a light emitting diode capable of diffusing a green colour and a red colour to indicate to the person using/wearing the watch whether transmission was successfully completed (green light) or whether there was an error in transmission (red light). Other means for indicating successful transmission or an error in transmission, i.e. the state of the transmission, can be implemented, for example by turning one or more hands of the time display in a first and a second sequence as a function of the state of transmission (successful transmission or error in transmission) or by displaying an alphanumeric character or a symbol indicating the state of transmission by means of an LCD or OLED display arranged, for example, on one part of the electronic watch dial.

Through a decoding operation, microcontroller 21 of the watch is able to reconstitute the numerical value corresponding to the new deviation in operating frequency. Microcontroller 21 will then determine an inhibition value as a function of the reconstituted numerical value, and then replace the initial inhibition value with this new inhibition value in memory 33 of operating frequency adjustment circuit 32. Adjustment circuit 32 will then inhibit one or more pulses in the second stage of frequency divider circuit 28 to correct the operating frequency so that the latter is as close as possible to the desired value.

In a variant, the calculation to determine the inhibition value as a function of the desired operating frequency deviation (or error of rate) can be performed by the microcontroller of portable electronic device 12, before the light sequence is sent. In this variant, the microcontroller of the portable electronic device: i) generates a pulsed signal representative of the calculated inhibition value; ii) converts the pulsed signal into a corresponding optical pulse sequence, and then iii) transmits the modulated optical signal via the light source to optical sensor 16 of electronic watch 10. Microcontroller 21 of electronic watch 10 will then reconstitute the inhibition value and then write this inhibition value in the appropriate register of memory 33 of adjustment circuit 32.

It should be noted that optical sensor 16 is advantageously deactivated once the modulated optical signal has been successfully transmitted from portable electronic device 12 to electronic watch 10, preferably automatically after the expiration of a timeout to avoid unnecessary use of power unit 22.

In another embodiment, portable electronic device 12 includes a real-time clock 40 whose frequency has already been synchronized with the frequency of an external source clock propagating Coordinated Universal Time (UTC). Electronic watch 10 also includes a real-time clock 40. Unlike the embodiment that has just been described, the computer application is configured to generate in portable electronic device 12 a pulsed reference signal representative of UTC time.

Microcontroller 21 of electronic watch 10 is configured, in this embodiment, to successively: i) reconstitute the numerical UTC time value; b) compare said numerical value to a numerical value of real-time clock 40 of electronic watch 10; and then c) correct the initial inhibition value stored in memory 33 as a function of this comparison.

The synchronization of clock 40 of portable electronic device 12 with the external source clock propagating UTC time is, for example, achieved by means of a network time protocol NTP wherein synchronization with the actual UTC time is ensured with a typical uncertainty of a few milliseconds, or a few tens of milliseconds. In a variant, portable electronic device 12 further includes a global navigation satellite system (GNSS) of the GPS or Galileo type. Real-time clock 40 of portable electronic device 12 can then be synchronized with the frequency of the external source clock propagating UTC time by means of the GNSS.

It is to be noted that the method consisting in comparing UTC time to real-time clock 40 of electronic watch 10 is independent of any time adjustment made by the person using/wearing the electronic watch. Real-time clock 40 corresponds to UTC time whereas clocking unit 24 is connected to the time display, for example by driving the hands of an analogue display by exciting the coils of the stepping motor with signal S1 generated at the output of frequency divider circuit 28.

In one embodiment, electronic module 20 of electronic watch 10 is configured to display and/or transmit to portable electronic device 12 or to a remote server (not illustrated) a signal representative of a differential numerical value corresponding to the difference between the frequency of the real-time clock of electronic watch 10 prior to correction and the frequency of the external source clock. The computer application of portable electronic device 12 is capable, when operational, of acquiring the differential value displayed and/or sent by electronic watch 10 by means of a camera, a microphone or an optical sensor (not illustrated) comprised in portable electronic device 12.

The differential value is then stored in a memory of portable electronic device 12 or in a server memory. A new differential value is sent and stored in the memory of the portable electronic device or of the server at each iteration of the operating frequency adjustment method according to the invention. The various differential values are then compared to each other. This comparison makes it possible to predict the oscillator frequency variation over time, for example by modelling in a logarithm function, in order to determine a numerical correction value which takes account of frequency variations due to the ageing of the oscillator during a subsequent operating frequency correction according to the method of the invention.

Further, the electronic watch module can comprise an operating temperature correction system 60, for compensating for the effect of temperature on the quartz oscillator. In such case, memory 33 includes, in addition to the inhibition value, one or more temperature correction values. The parameter or parameters are used to periodically calculate, for example every four minutes, an inhibition value as a function of temperature, for finer adjustment of the operating frequency. The operating frequency adjustment method thus makes it possible to send, from the electronic device to the electronic watch, corrected temperature correction parameters, in the modulated optical signal. These corrected temperature correction parameters will then replace the former temperature correction values stored in memory 33.

It will be clear that various modifications and/or improvements and/or combinations evident to those skilled in the art may be made to the various embodiments of the invention set out above without departing from the scope of the invention defined by the annexed claims. For example, a modulated optical signal can be transmitted from the portable electronic device not by one or more light emitting diodes normally used as a flash, but by a modulation of the light transmitted by the screen of the portable electronic device.

The invention claimed is:

1. A method of adjusting an operating frequency of an electronic watch with a computer application installed in a portable electronic device comprising first processing circuitry, a light source, and a screen, wherein the electronic watch comprises an electronic module including an oscillator, and a frequency divider circuit arranged downstream of the oscillator and configured to transmit a pulsed signal corresponding to the operating frequency, an operating frequency adjustment circuit including a memory storing an inhibition value, the operating frequency adjustment circuit being configured to send an inhibition signal to inhibit one or more pulses transmitted by the frequency divider circuit based on the stored inhibition value, a communication unit configured to communicate with the portable electronic device, the communication unit including an optical sensor arranged to receive a modulated optical signal in a form of a sequence of optical pulses, and second processing circuitry configured to control the operating frequency adjustment circuit based on the modulated optical signal received by the communication unit, the method comprising:

generating, by the first processing circuitry, a pulsed reference signal, converting the pulsed reference signal into a modulated optical signal including light pulses, transmitting, by the first processing circuitry to the optical sensor of the communication unit of the electronic watch, the modulated optical signal via the light source or via a modulation of the light emitted by the screen of the portable electronic device, reconstituting, by the second processing circuitry, the pulsed reference signal from the modulated optical signal received by the optical sensor, correcting the inhibition value stored in the memory of the operating frequency adjustment circuit based on the pulsed reference signal, and transmitting, from the operating frequency adjustment circuit to the frequency divider circuit, an inhibition signal based on the corrected inhibition value, the transmitting being performed periodically based on a control signal sent from the frequency dividing circuit to the operating frequency adjustment circuit.

2. The method according to claim 1, wherein the pulsed reference signal includes coding of a new inhibition value used to replace the inhibition value stored in the memory during the correcting step.

3. The method according to claim 1, wherein the pulsed reference signal includes coding of an offset value used to increase or reduce the inhibition value stored in the memory during the correcting step.

4. The method according to claim 1, wherein the screen of the portable electronic device includes an interface to enter a numerical value used to generate the pulsed reference signal.

5. The method according to claim 1, wherein the electronic watch includes a real-time clock previously synchronized to Coordinated Universal Time (UTC), the pulsed reference signal includes coding of the UTC time, and the method further comprises:

reconstituting, by the second processing circuitry, the UTC time from the pulsed reference signal;

comparing the reconstituted UTC time to a time given by a real-time clock of the electronic watch; and correcting, by the second processing circuitry, the inhibition value stored in the memory as a function of a result of the comparison.

6. The method according to claim 5, further comprising obtaining, by the first processing circuitry, the UTC time used to generate the pulsed reference signal with a network time protocol via an external source clock.

7. The method according to claim 5, wherein the portable electronic device further includes a global satellite navigation system, and wherein the obtaining step comprises obtaining the UTC time used to generate the pulsed reference signal with the global satellite navigation system.

8. The method according to claim 5, wherein the portable electronic device is connectable to a mobile telephone network, and the obtaining step comprises obtaining the UTC time used to generate the pulsed reference signal via the mobile telephone network.

9. The method according to claim 5, further comprising transmitting, by the second processing circuitry to the portable electronic device or to a remote server, a signal representative of a difference between a frequency of the real-time clock of the electronic watch before and after correction.

10. The method according to claim 9, wherein the step of transmitting the signal representative of the difference is performed by optical transmission of a second modulated signal consisting of light pulses, the second modulated signal being transmitted by a light transmitter of the electronic watch to an optical sensor of the portable electronic device.

11. The method according to claim 1, wherein the memory of the electronic watch stores a temperature correction parameter, the pulsed reference signal includes coding of at least one corrected temperature correction parameter, and the method further comprises correcting the temperature correction parameter stored in the memory of the operating frequency adjustment circuit as a function of the pulsed reference signal.

12. The method of claim 1, further comprising transmitting to the portable electronic device, a signal representative of a difference between a frequency of a real-time clock of the electronic watch before and after correction of the inhibition value.

* * * * *